Feb. 3, 1959 C. M. G. WALLWORK 2,871,527
METHOD OF AND MEANS FOR THE PRODUCTION OF CASTINGS
Filed March 6, 1957 13 Sheets-Sheet 1

INVENTOR
CHARLES MICHAEL GEOFFREY WALLWORK
by Walter S. Pleston
ATTORNEY

Feb. 3, 1959 C. M. G. WALLWORK 2,871,527
METHOD OF AND MEANS FOR THE PRODUCTION OF CASTINGS
Filed March 6, 1957 13 Sheets-Sheet 4

INVENTOR
CHARLES MICHAEL GEOFFREY WALLWORK
by Walter S. Pleston
ATTORNEY

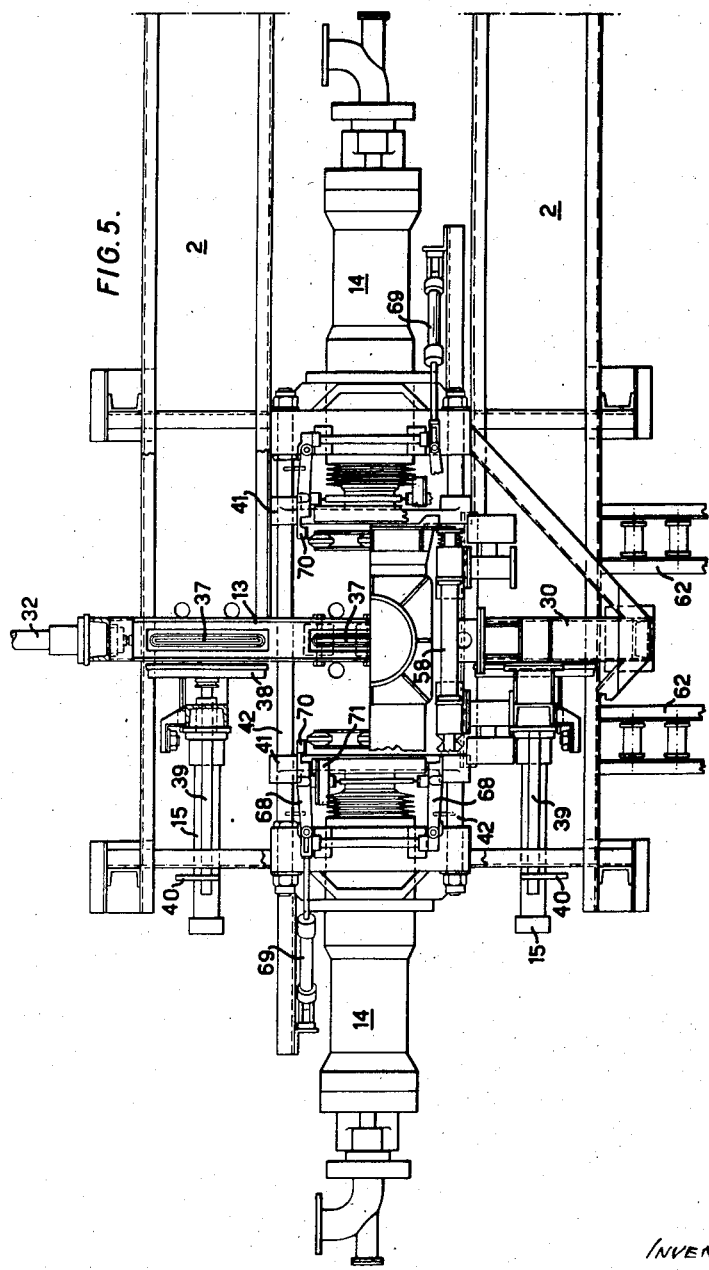

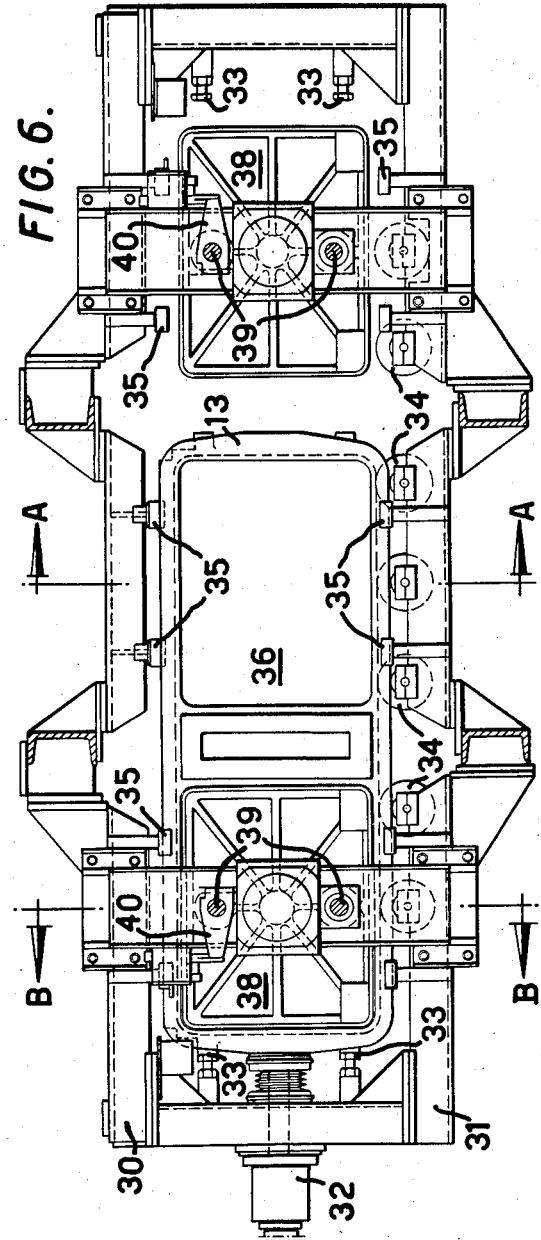

Feb. 3, 1959 C. M. G. WALLWORK 2,871,527
METHOD OF AND MEANS FOR THE PRODUCTION OF CASTINGS
Filed March 6, 1957 13 Sheets-Sheet 7
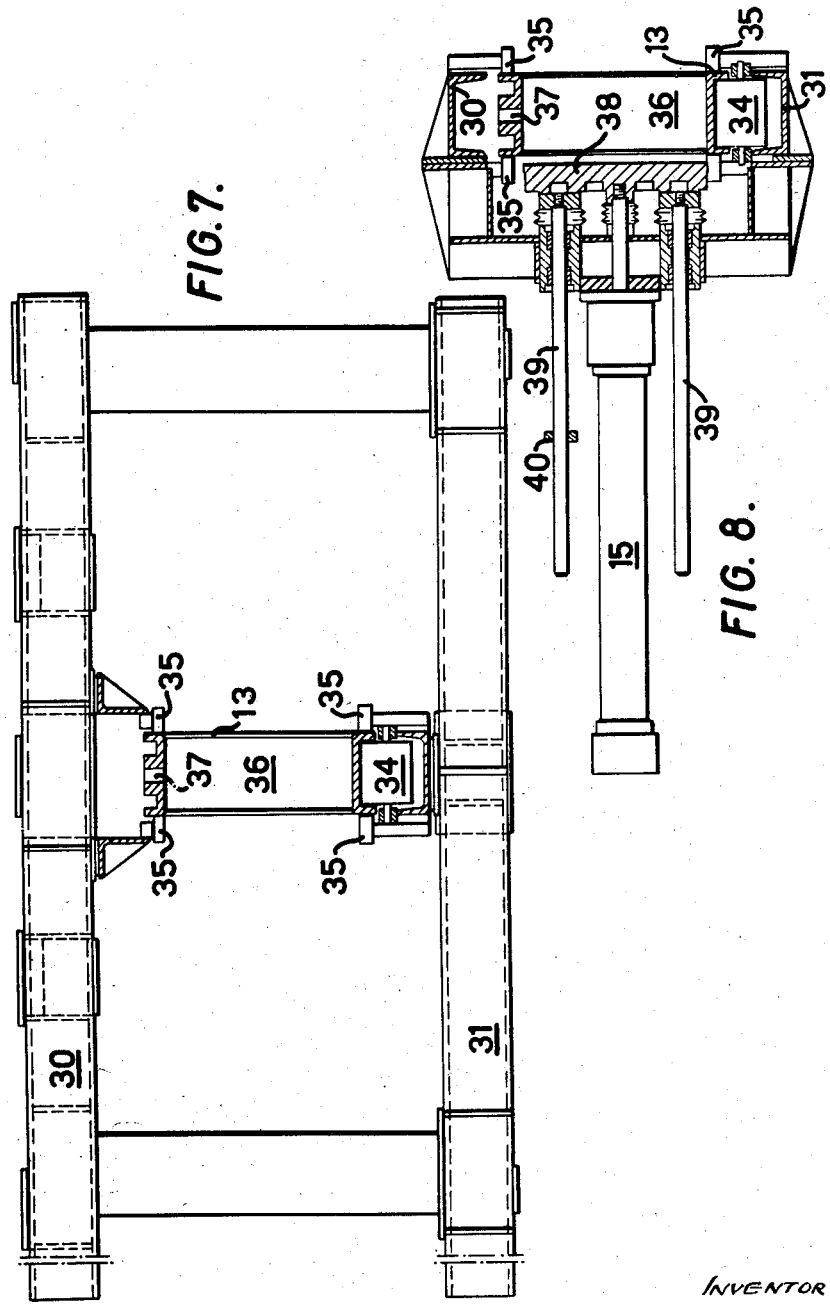
INVENTOR
CHARLES MICHAEL GEOFFREY WALLWORK
by Walter S. Alston
ATTORNEY Feb. 3, 1959  C. M. G. WALLWORK  2,871,527
METHOD OF AND MEANS FOR THE PRODUCTION OF CASTINGS
Filed March 6, 1957  13 Sheets-Sheet 8

INVENTOR
CHARLES MICHAEL GEOFFREY WALLWORK
by Walter S. Bleston
ATTORNEY

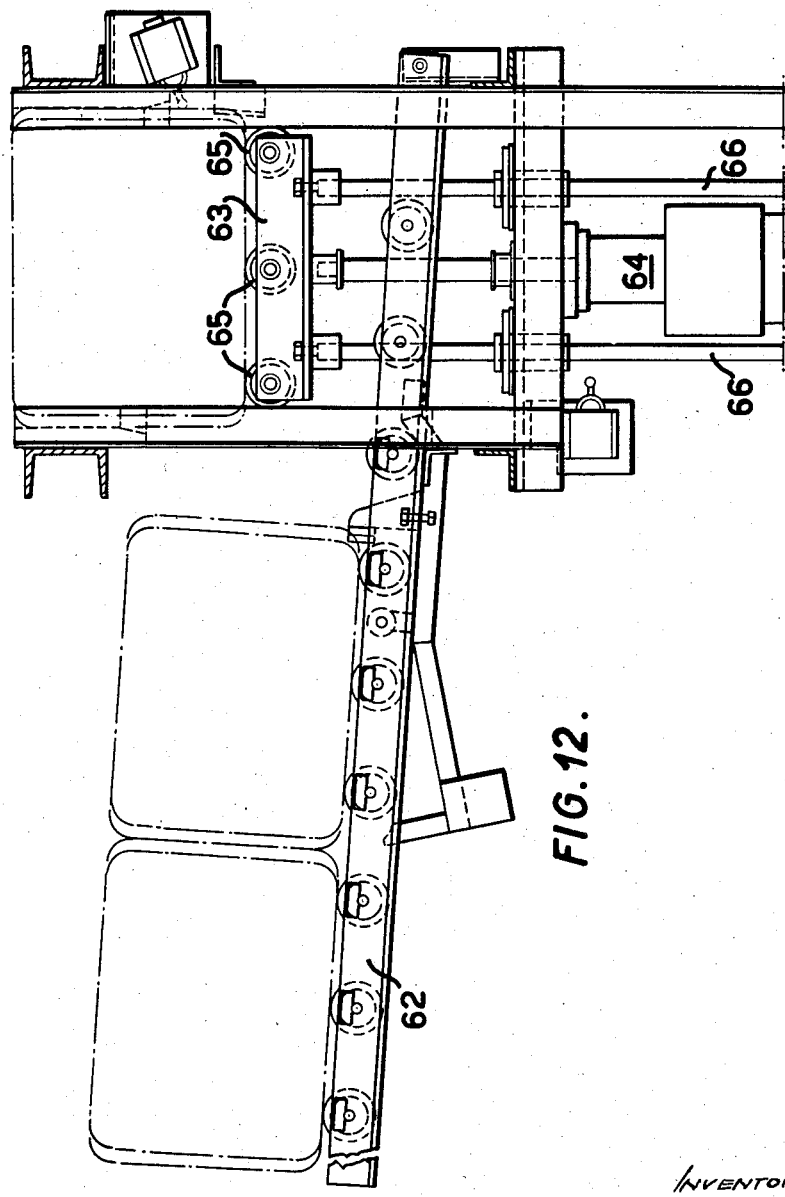

Feb. 3, 1959  C. M. G. WALLWORK  2,871,527
METHOD OF AND MEANS FOR THE PRODUCTION OF CASTINGS
Filed March 6, 1957  13 Sheets-Sheet 12

INVENTOR
CHARLES MICHAEL GEOFFREY WALLWORK
by Walter S. Pleston
ATTORNEY

United States Patent Office 2,871,527
Patented Feb. 3, 1959

2,871,527

METHOD OF AND MEANS FOR THE PRODUCTION OF CASTINGS

Charles Michael Geoffrey Wallwork, Hale, England, assignor of one-half to Henry Wallwork & Company Limited, Manchester, England, a British company Application March 6, 1957, Serial No. 644,351

Claims priority, application Great Britain March 9, 1956

11 Claims. (Cl. 22—20)

This invention relates to a new or improved method of and means for the production of castings in a foundry and more particularly to the quantity production of castings with a minimum of labour and handling of materials.

One object of the invention is to produce more accurate castings requiring little or no dressing and another is to maintain close control of foundry variables.

Hitherto the usual method of making castings has been to prepare the two parts of a mould in mating mould boxes or flasks which are clamped together while metal is poured into the mould.

According to the invention in its broadest aspect metal is cast in a series of moulds with or without boxes or flasks while the successive moulds are held in close contact with each other in a tunnel or channel having a cross-section such that the moulds are a sliding fit therein.

The moulds are moved intermittently past a station where the metal is poured into the moulds individually, in batches, or continuously, and then on to a station where the moulds are broken up, as for example in a rumbling barrel, and the sand is separated from the castings which are then sand-blasted and carried away by a conveyor or other convenient means for cooling inspection and dressing. The castings may be sand-blasted wet or dry with sand screened from the disintegrated moulds, and the sand or a proportion of it may be returned for re-use.

Alternatively, the castings may be shot-blasted or rumbled with hard stars.

New or reclaimed moulding sand may be dried by feeding it on to the moulds after they leave the casting station so that it is dried by the heat of the moulds and passes with them into the rumbling barrel.

Alternatively, sand may be dried separately by utilising waste heat from a castings cooling conveyor or other source.

It is desirable for the process that the moulds should have sufficient mechanical strength, and such moulds can be produced in various ways. They can be produced, for example by high pressure moulding with a clay or resin bond, or by the shell-moulding process, or by the use of a chemical and gas binder. In a preferred method of operation sodium silicate is used as the binder and the moulds are gassed with $CO_2$.

The whole of the operations including the mixing and delivery of sand to the moulding machine, the formation of the moulds and their delivery into and their feeding along the tunnel or channel, the pouring of the metal, the separation and cleaning of the castings and the collection and return of the sand can all be arranged to take place automatically in the proper order without any labour other than supervision and inspection.

Thus castings can be produced at a very high rate and at a minimum cost, with all variables under control.

The improved process is not limited to the production of very long runs of identical castings as to change from one casting to another it is only necessary to change the pattern plates and those can be designed in such a way that they can be stored adjacent to the moulding station and changed in a minimum of time.

An example of a moulding and casting plant according to the invention, and the method of operating it, will now be described with reference to the accompanying drawings, in which:

Figure 5 is a plan view of the moulding station;

Figure 6 is an elevation to a still larger scale of the slider assembly in the moulding station, with other parts of the machine omitted;

Figure 7 is a section on the line A—A in Figure 6;

Figure 8 is a section on the line B—B in Figure 6;

Figure 11 is a longitudinal sectional elevation of one of the hydraulic rams for applying the moulding pressure;

Figure 12 is a detail of the moulding station showing the mechanism for introducing new patterns, taken on the line D—D in Figure 13;

Figure 1:
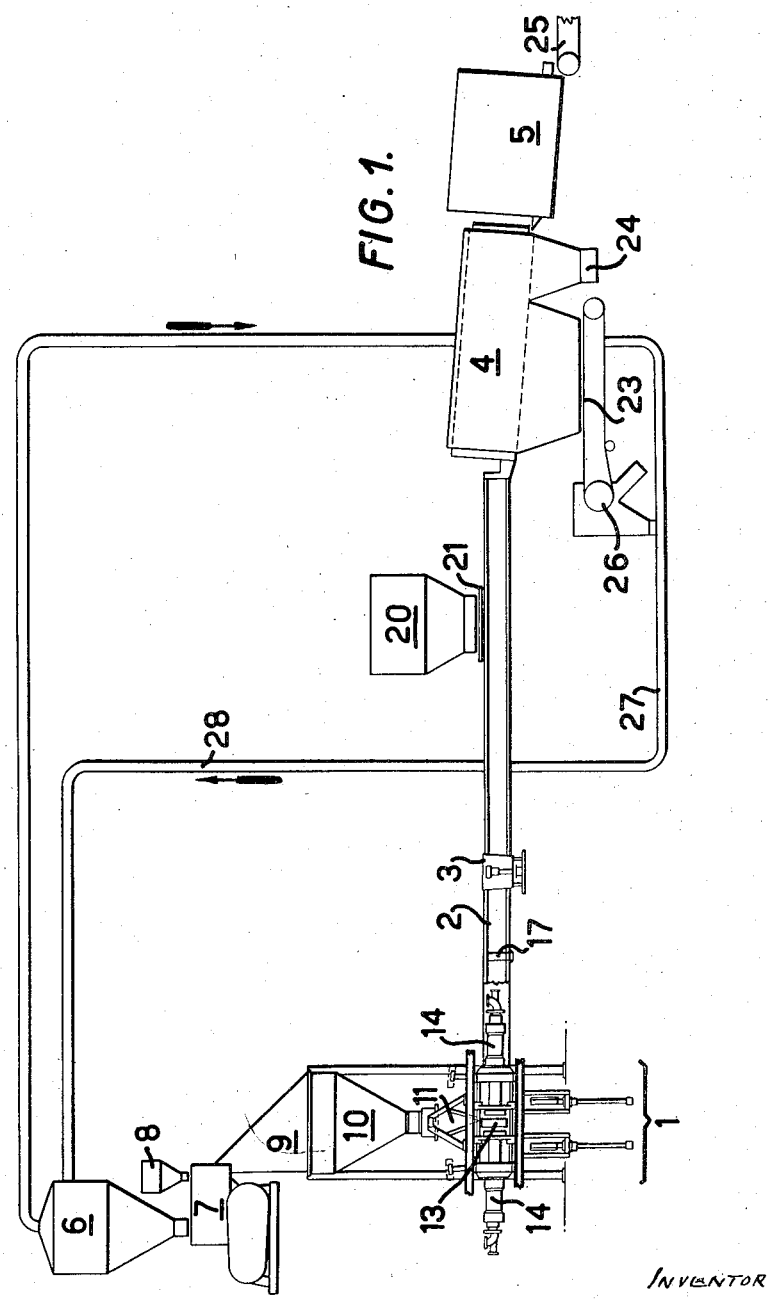
Figure 1 is a diagrammatic side elevation of the whole plant.
Figure 2:
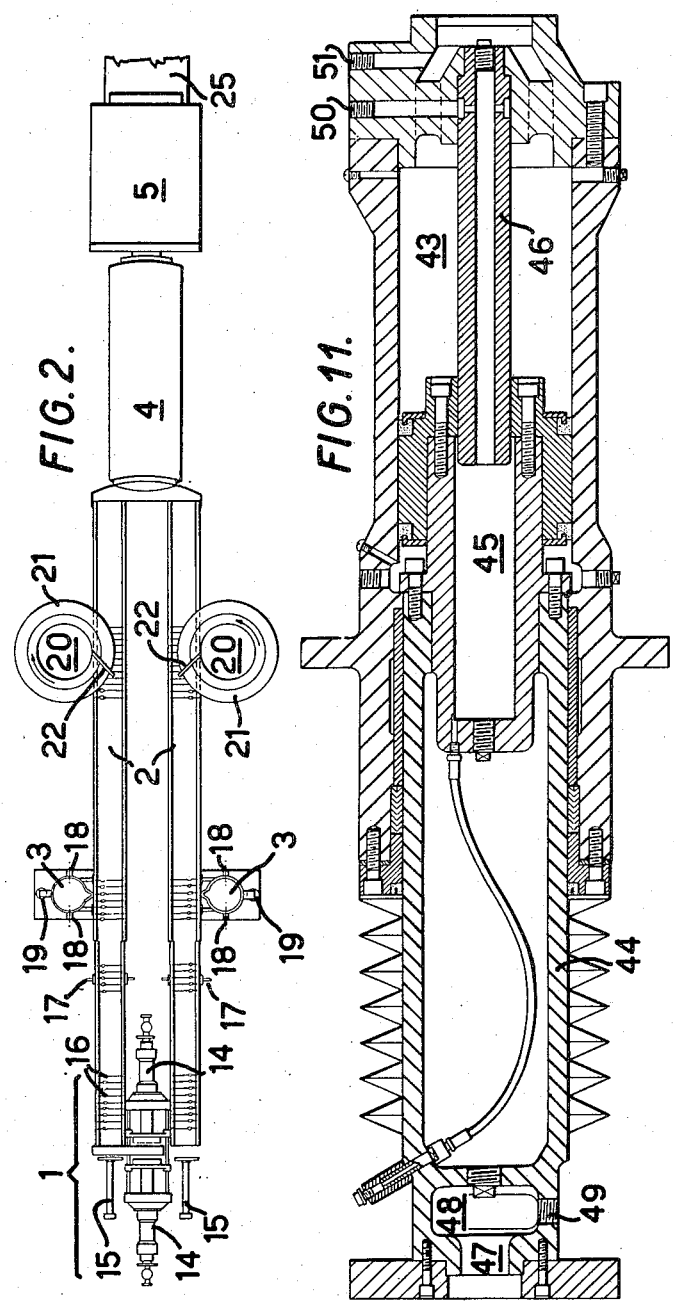
Figure 2 is a plan view of the plant.

Referring first to Figures 1 and 2, the plant comprises broadly a moulding station 1, two parallel mould-guiding channel-like tracks 2, pouring ladles 3, a rumbling barrel 4 and a shot-blasting machine 5.

Sand for making the moulds is stored in a hopper 6, from which it passes into a mixer 7 to be mixed with a binding agent from a hopper 8. In the present example this agent is sodium silicate which is subsequently hardened with carbon dioxide. The mixed sand and binder pass through a chute 9 to a hopper 10 at the moulding station 1. A gate, to be described in detail later, controls the passage of the mixture from the hopper 10 into a blowing head 11 which can be moved vertically and which terminates at its lower end in an elongated slot-shaped nozzle.

Below the nozzle there is a slider 13 which acts in very much the same manner as the slide-holder of a photographic slide projector, being reciprocable horizontally across the plant into either of two positions. The slider 13 is pierced by two rectangular openings forming boxes, as will become clearer in the later description; in one position of the slider the centre of one opening or box is on the longitudinal centre line of the plant and the other is in line with one of the guide tracks 2; in the other position the first-mentioned opening or box is in line with the other track 2 and the other opening or box is on the centre-line of the plant. The upper edge of the slider is pierced by two slots which communicate with the openings or boxes and one of which receives the nozzle of the blowing head 11 when its corresponding opening is on the centre-line of the plant.

Pattern plates, not visible in Figures 1 and 2, are arranged to be brought up against opposite sides of that opening or box which is on the centre-line of the plant, by means of opposed horizontally acting hydraulic rams 14. Moulding material is blown into the opening from the head 11, the rams 14 force the pattern plates further towards one another to compress the moulding material, the mould thus formed is then gassed in a manner to be described later, and the pattern-plates are then retracted. The slider 13 is moved to its other position and the moulding process just described is repeated in the other box, whilst the mould already formed in the first-mentioned box is now opposite one of the tracks 2 and is ejected into the track by a hydraulic ram 15. When the slider is returned to its original position the mould formed in the other box is similarly ejected into the other track 2.

The process just described is repeated continually, so that moulds are fed alternately into each of the two tracks 2. Each mould has complementary pattern impressions in its opposite end faces, so that it forms in effect the back of one complete mould pair and the front of the next. It will be appreciated that, as the process proceeds, each track 2 has built up in it a continuous length of moulds abutting against one another, and the patterns are such as to leave a runner cup 16 at each interface between two moulds. As the ram 15 is operated to push a new mould out of the slider 13 the whole line of moulds in the track 2 is moved down the track by a distance equal to the thickness of one mould.

The sodium silicate binder gives the moulds sufficient strength to be self-supporting when they are ejected from the slider 13 and in any case they are subsequently supported by the walls of the track 2 which is in the form of a tunnel with an open top.

Spaced a short way along each track 2 there is a clamp 17 having jaws actuated by a pneumatic cylinder to engage opposite sides of the moulds and hold the line of moulds against movement. The valves controlling the admission of pressure air to the cylinder are interconnected with the controls of the corresponding hydraulic ram 15 in such a way that the clamp 17 is released when a mould ejected from the slider 13 by the ram 15 touches the preceding mould and is applied again when the ram 15 has completed its forward movement.

Beyond the clamps 17 each track 2 has its pouring station comprising the ladle 3 mounted on trunnions 18 and tilted by a ram 19. Actuation of the ram 19 is controlled in synchronism with the ram 15 and the clamp 17 so that metal is poured into the mould when the line of moulds is stationary and is held against mutual separation by the gripping action of the clamp 17.

At a further point down the tracks 2, hoppers 20 carry new sand which is distributed onto the tops of the two intermittently moving lines of moulds by means of rotating discs 21 and fixed inclined plates 22. The heat given out by the castings as they cool dries out the new sand as it lies on the tops of the moulds.

The ends of the tracks 2 lead into the common rumbling barrel 4 which breaks up the moulds as they fall into it, and the fine sand from them, together with the new sand that has been added from the hoppers 20, passes through a sieve onto a conveyor belt 23. The coarser particles which the rumbling barrel fails to break down pass out through a chute 24 to waste, and the castings themselves are passed through the continuous shot-blasting machine 5 onto a conveyor belt 25 for fettling. The action of the rumbling barrel will have broken off the runners and risers from the castings and may also have trimmed off part of any flash present. All these come out on the belt 25 and can be separated by hand.

The sand which falls onto the belt 23 is passed over a magnetic separating drum 26 to remove any ferrous particles which may have found their way into it, and thence into a pneumatic conveyor system comprising a pipe 27 which carries it up into the top of the dry sand storage hopper 6. The spent air returns by way of a pipe 28. During the course of its passage between the rumbling barrel 4 and the hopper the sand is cooled sufficiently to be ready for use over again.

The above is a brief description of the cycle of operations of the plant. It will be seen that the moulding sand is continually recycled, apart from a certain amount of wastage which may be about twenty percent and is made up by the new sand added from the hoppers 19.

Castings are produced continuously at a rate that is only limited by the speed at which the moulding machine can work and the minimum time of passage required between the pouring station and the rumbling barrel for the castings to have solidified.

The moulding station 1 will now be described in more detail with reference to Figures 3 to 8. Its basic framework is built up of channel and angle rolled steel sections and carries top and bottom guides 30 and 31 respectively for the slider 13, which is reciprocated across the plant between successive moulding operation by means of a hydraulic ram 32, the two end positions being defined by stops 33. The slider is supported on rollers 34 (Figure 6) in the bottom guide 31 and is located by rollers 35 on the top and bottom guides. One of the openings or boxes in the slider 13 can be seen at 36 in Figures 6 to 8, and 37 is one of the slots in the top of the slider into which the nozzle of the blowing head fits.

Each of the ejecting rams 15 carries on its operative end a rectangular ejector plate 38 which has a clearance fit in the opening 36. The plate is guided by rods 39 on one of which a stop 40 (Figures 5 and 8) is mounted to actuate a limit switch defining the end position of the ejecting movement.

Figure 3:
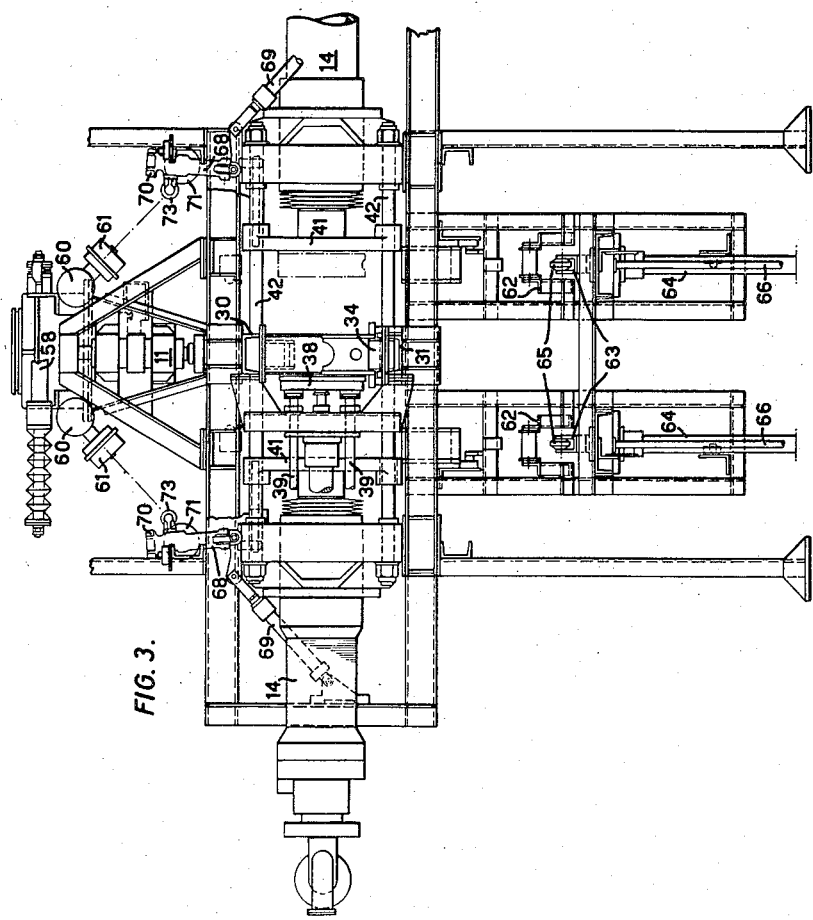
Figure 3 is a side elevation to a larger scale of the moulding station shown in the left-hand side of Figure 1.
Figure 4:
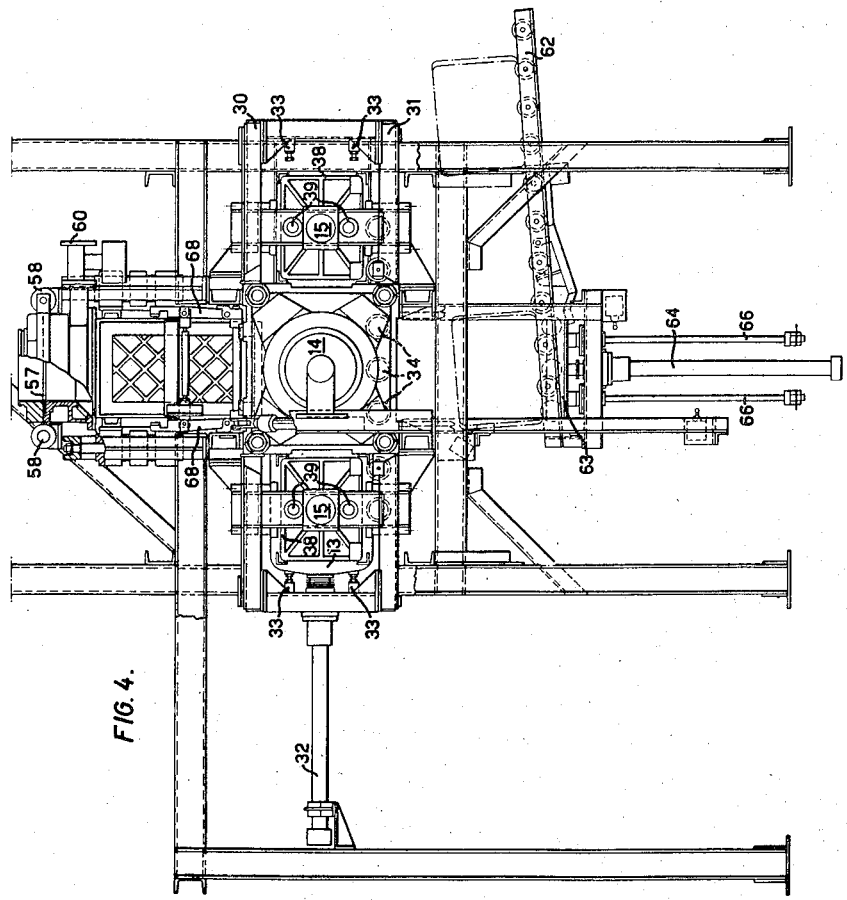
Figure 4 is an end elevation of the moulding station, looking from the left in Figure 3.

The moulding rams 14 are shown in their fully retracted positions in Figures 3 and 5, and in Figure 11 one of them is shown in detail in its extended position. The pattern plates are mounted on the faces of platens 41 which can slide on fixed guides 42 under the action of the rams, to which the platens are secured. Referring now to Figure 11, each ram has a fixed main cylinder 43 and a moving piston 44 which itself contains a small cylinder 45 into which a hollow fixed piston 46 protrudes. The head of the main piston 44, to which the platen is secured, contains an axial passage 47 opening into a chamber 48 and this in turn has three passages, of which one is visible at 49, opening out of it. The platen and the pattern plate have openings in them which are aligned with the passage 47, so that by suitable connections to the three passages 49, and by appropriate control of valves, air or carbon dioxide under pressure can be admitted to the interior of the moulding space through the chamber 48, or can be exhausted from the moulding space.

A connection from a source of hydraulic pressure is made through a bore 50 and the hollow piston 46 to the small cylinder 45 and a further connection is made through a passage 51 to the interior of the main cylinder 43. In operation of the machine hydraulic pressure fluid is first admitted to the small cylinder 45 of each ram to bring the pattern plates up to opposite sides of the opening 36 and sand is blown in from the blowing head, then the final moulding pressure is applied by admitting fluid to the main cylinders 43 of the rams.

Figure 9:
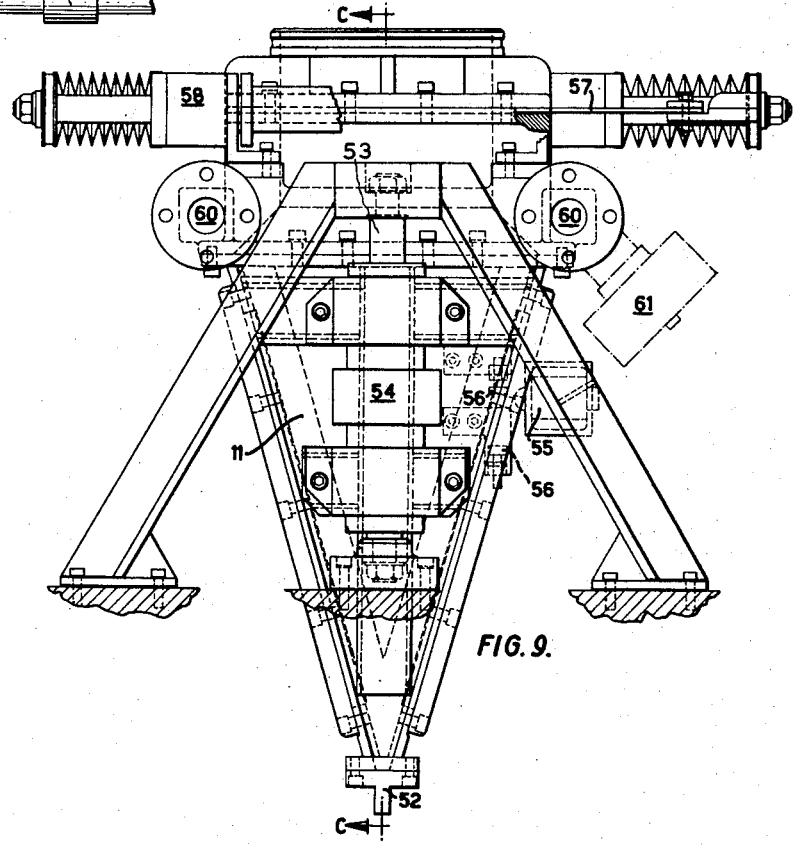
Figure 9 is a side elevation of the hopper and blowing head.
Figure 10:
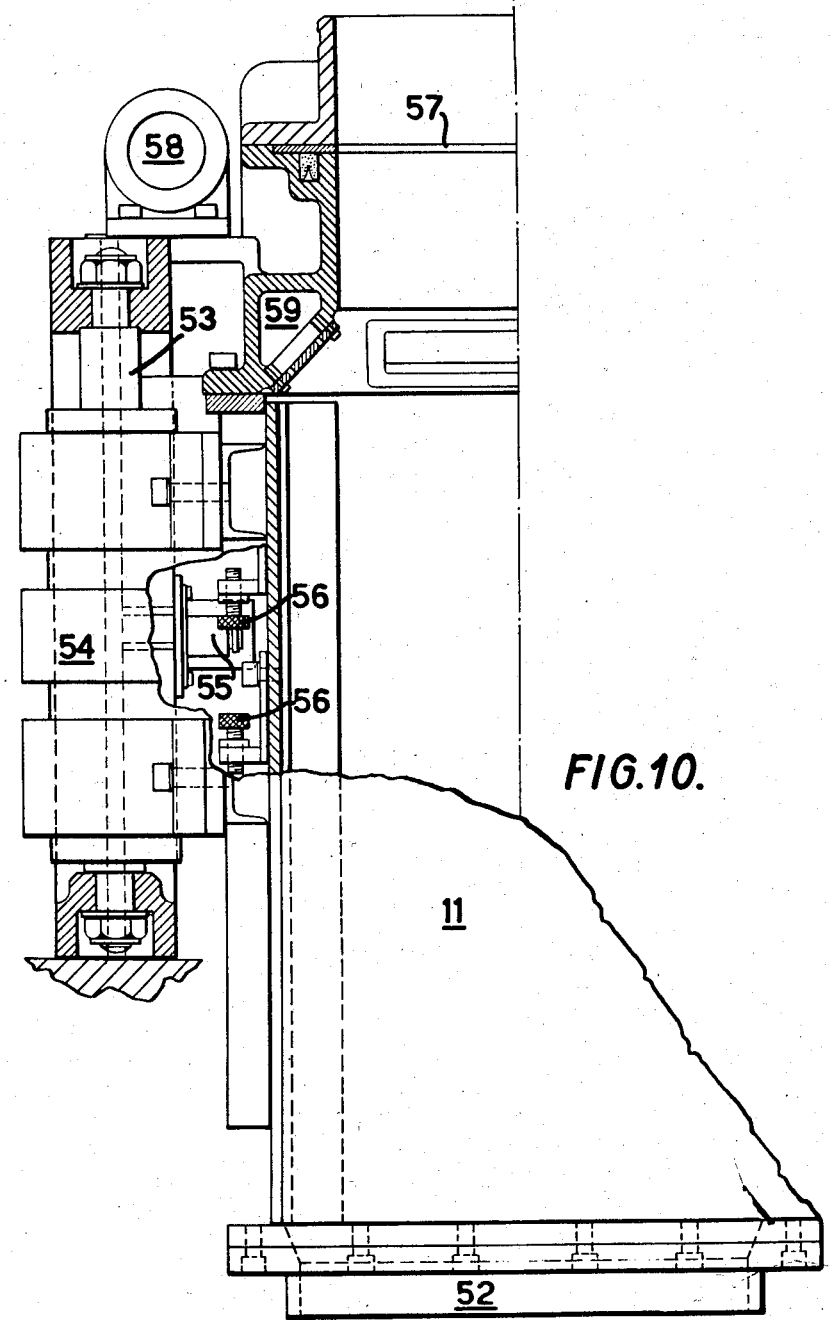
Figure 10 is a part-section of the hopper and blowing head, taken on the line C—C in Figure 9.
Figure 13:
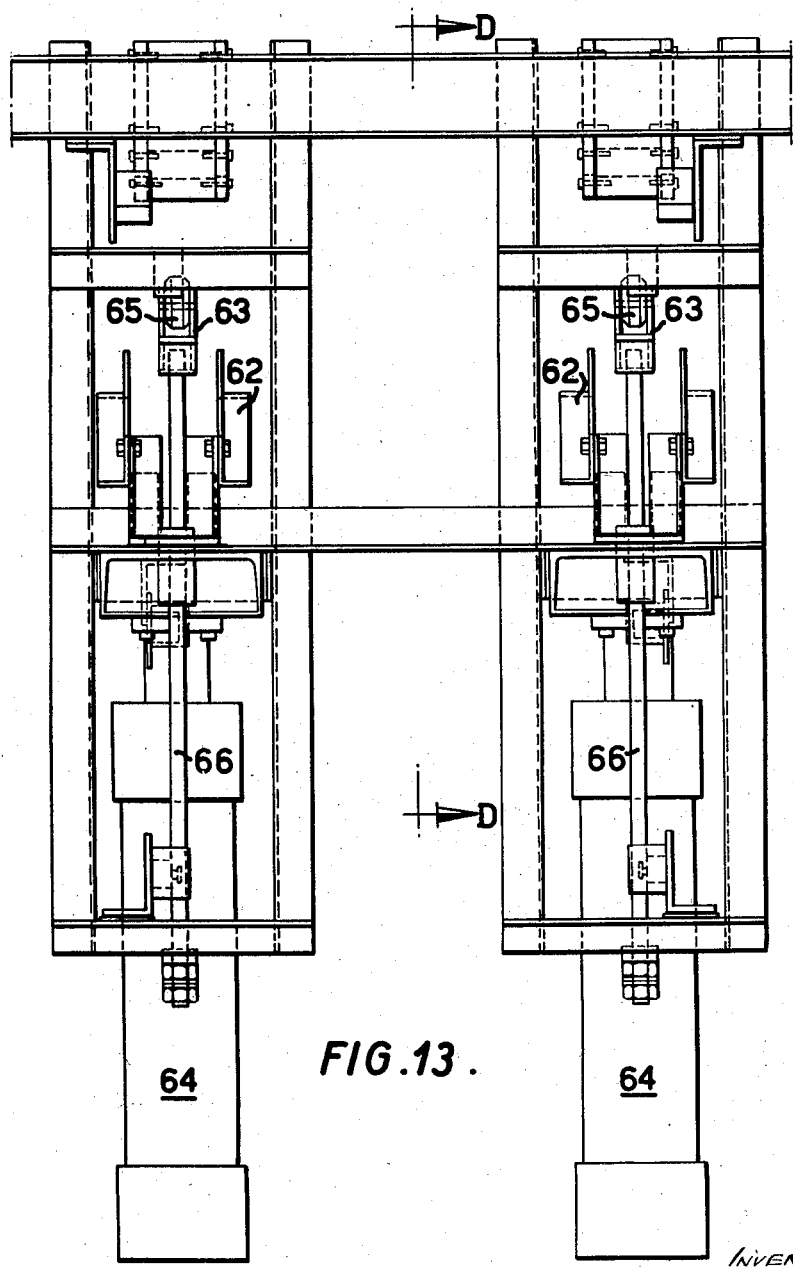
Figure 13 is a view looking from the left in Figure 12.

Referring now to the blowing head 11 shown in Figures 9 and 10, it is of a wedge shape, terminating in a slot-like nozzle 52 which is designed to be received in one or other of the slots 37 in the top edge of the slider 13. The whole head is reciprocable vertically on a pair of fixed side pillars 53 secured to the main structure of the machine. Movement is effected by cylinders 54, and controlled by limit switches 55 actuated by stops 56. A horizontal plate 57 forms a gate controlling the entry of sand-binder mixture into the head and is apertured over one half but not the other. It is reciprocated horizontally under the action of a pair of double-acting rams 58 mounted on opposite sides of the head. Air is admitted to the blowing head from a manifold 59 around its upper edge, supplied from three pressure air connections of which two are visible at 60 in Figure 9, and under the control of valves of which one is indicated at 61.

It will be appreciated that to change from one casting to another it is only necessary to change the pattern plates and if the plant is to be used for the production of long runs of identical castings the pattern plates can be bolted or otherwise secured to the platens as the time required to change pattern plates is not important. However, it is preferred that the plant should be capable be capable of dealing with short or long runs as required and in the plant illustrated provision is made for the rapid changing of pattern plates which can be stored adjacent to the moulding machine.

Figure 16:
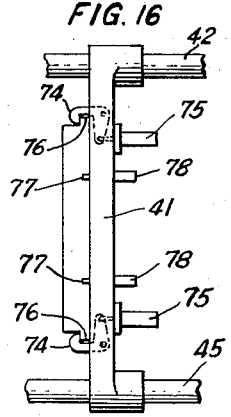
Fig. 16 is a plan view of a platen carrying a pattern plate and showing the means by which the pattern plate is clamped and located.
Figure 17:
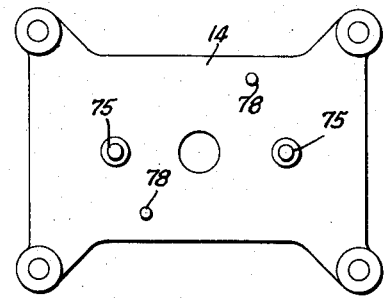
Fig. 17 is a rear elevation of the platen omitting its actuating ram.

The mechanism for removing and changing pattern plates is shown in Figures 12 to 15. In line with the positions occupied by the pattern plates in use when the rams 14 are fully retracted, but below the level of them, there are inclined roller conveyors 62 designed to carry the new pattern plates to be inserted. Each conveyor is slotted longitudinally over that portion which lies directly below the pattern plate in use, to allow the upward passage through it of a carrier 63 under the action of a hydraulic ram 64. Each of the carriers 63 is equipped with three rollers 65 on which the new pattern plate rests and is guided by rods 66. The platens 41 are equipped with clamps 74 (see Figs. 16 and 17), which are actuated by pneumatic cylinders 75 and grip the sides of the patterns in use, engaging over special flanges 76 provided on the ends of the pattern plates. There are also two locating pins 77 at diagonally opposite corners of each platen 41, which can be moved by pneumatic cylinders 78 in a direction parallel to the direction of movement of the platen and which engage corresponding holes in the pattern plate to locate it accurately. In this way, as the two platens are firmly guided on the guides 42, the two patterns are maintained accurately in register with one another.

When the locating pins have been withdrawn the rams 64 are operated to lift the new patterns. The clamps are released when the new patterns engage the underside of the patterns hitherto in use, these being pushed upwards and the new patterns taking their place.

Figure 14:
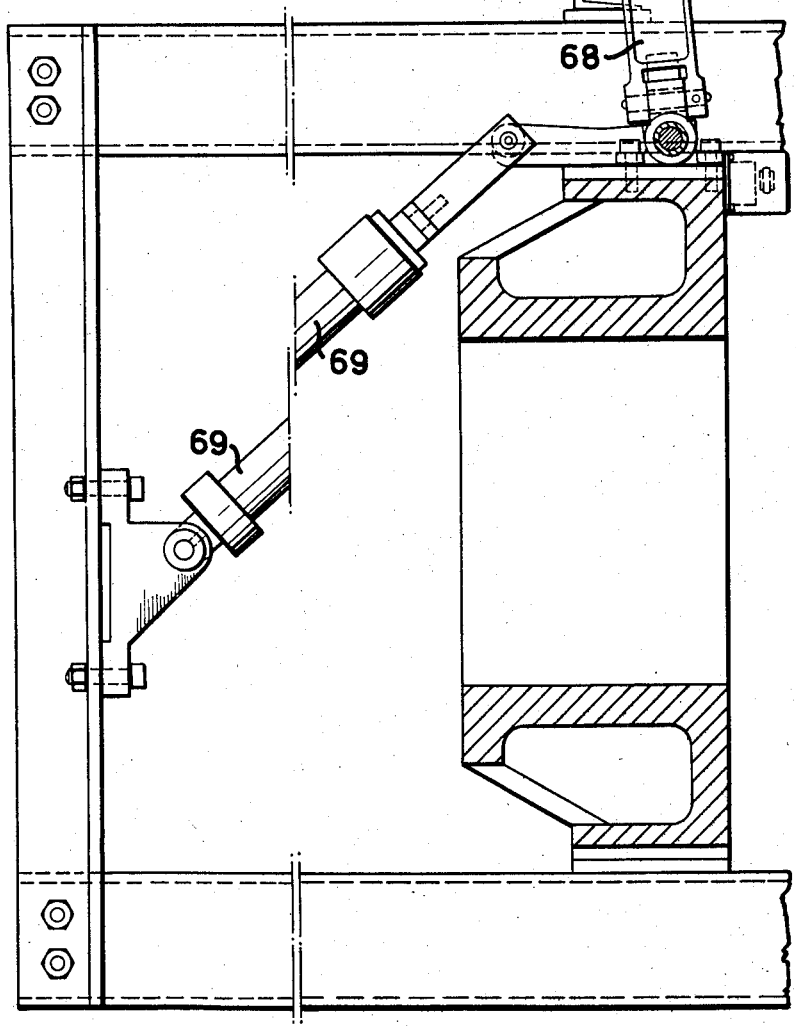
Figure 14 is a detail of the moulding station showing the pattern removal mechanism, being a section on the line E—E in Figure 15.
Figure 15:
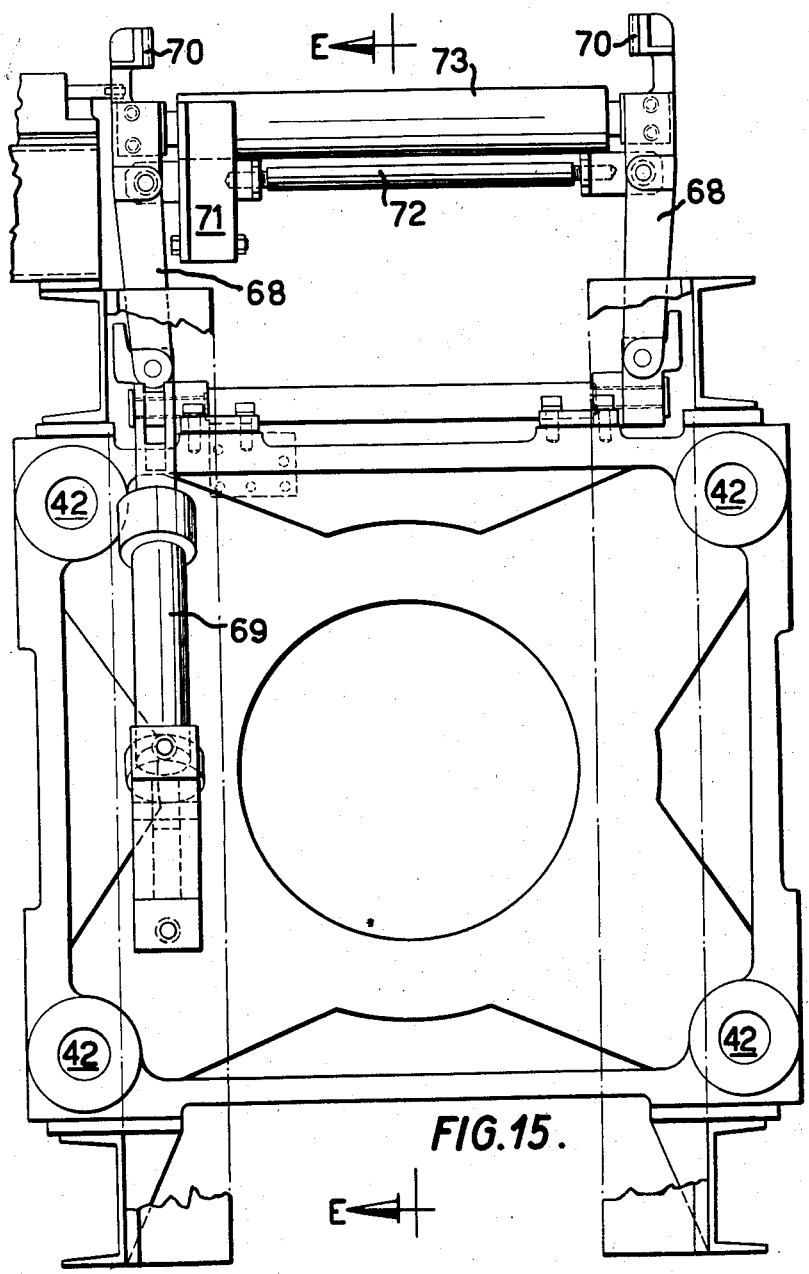
Figure 15 is a view of this mechanism looking from the left in Figure 14.

Above the level of the platens 41, the main structure carries on each side a pair of arms 68, shown in Figure 14 in an almost vertical position, which can be turned down into the horizontal position by operation of an hydraulic ram 69. Jaws 70 on the two arms can be brought towards one another by operation of a pneumatic cylinder 71 in a tie rod 72 between the arms, and these jaws 70 pick up the pattern that has been pushed up out of the operative position, the arms then being returned to the position shown in Figure 14. The jaws 70 are opened and the displaced pattern falls onto a roller conveyor, not shown, of which the first roller is formed by a roller 73 mounted between the arms 68.

The operation of the moulding machine is as follows:

Assuming that two pattern plates are initially in position on the platens 41, the hydraulic pressure is admitted to the small cylinders 45 of the rams 14 to bring the pattern plates up to opposite sides of the opening 36 in the slider 13 and, with the gate 57 closed and sealed, the cylinder 53 lowers the blowing head 11 until the nozzle 52 fits in the slot 37 and the valves 61 are opened to admit pressure air at about one hundred pounds per square inch into the head 11 to blow a sand-sodium silicate mixture into the moulding space. The air escapes through the passages 47 and 49 in the platens 41.

When the moulding space is full the blowing head 11 is lifted and hydraulic pressure is admitted to the main cylinders 43 of the rams 14 to squeeze the mixture in the moulding space and at the same time carbon dioxide under pressure is admitted through passages 49 and 47 in the platens 41 to percolate through the mixture and act on the sodium silicate to set the mould. Finally compressed air is blown through the mould via chamber 48 to disperse the carbon dioxide rapidly through the mould.

The rams 14 then withdraw the pattern plates and the ram 32 moves the slider over to its other extreme position, in which one of the rams 15 ejects the finished mould into the corresponding track 2 whilst the clamp 17 is momentarily released to allow all the moulds in that track to move along one place.

In the meantime a new mould is being produced in the other opening 36, the blowing head 11 having been recharged by a double movement of the gate 57 under the action of the rams 58. And so the cycle is repeated indefinitely for as long as is desired. Without going into details, it will be understood that the operation of the various rams and valves in the cormrect sequence is effected automatically, by means of electric limit switches, solenoid-operated valves, pressure-responsive valves, and switches and the like, according to well-known techniques in the art of hydraulic and pneumatic control.

When a sufficient run of one particular article has been produced, a change of patterns can be effected automatically in the shortest possible time. The two new pattern plates are allowed to run down the roller conveyors 62 onto the carriers 63, or they may already be there, and, after the locating pins in the platens 41 have been withdrawn from the pattern plates in use and the clamps on the edges of the pattern plates released (which is effected automatically) the rams 64 lift the new plates into position, where they are clamped and located, whilst the old plates are picked up by the arms 68, turned through a little more than a right angle, and deposited on further gravity roller conveyors which carry them back to storage.

It will be understood that the invention is applicable to other forms of moulding, for example using a clay or resin bond, using shell-moulding techniques or other chemical or gas hardening techniques. If necessary the moulds may be carried in light boxes which fit into the openings 36 and are returned from the end of the plant and recirculated. Cores may be inserted, if required, in each mould before the next mould is ejected against it by the ram 15.

If shell-moulding is used, the pattern plates 41 are heated and sand mixed with a resin bond can be blown into the moulding space until shells of sufficient thickness are formed, the remaining sand being then withdrawn. The two shells are fed into the track 2 separated by a backing such as shot or loose sand.

Various refinements may be introduced into the plant without affecting the broad principles of its operation. For example, the moulds may be vibrated with high frequency low amplitude vibrations during consolidation and they may also be vibrated during casting.

The moulding material is completely enclosed during its conveyance and preparation and during the function of the moulds so that there should be no spillage of sand at any point and the whole plant can readily be kept clean and tidy and requires a minimum of attention.

I claim:

1. A process for the production of castings comprising the steps of feeding moulding material into an open-ended box, compressing the material in said box between opposed power-operated pattern plates to form moulds having complementary pattern impressions in their end faces, forcing the moulds successively out of the box into a channel in which they are a sliding fit, holding the moulds in the channel with their end faces in close contact, and pouring metal into the cavities formed by the cooperation of the complementary mould impressions in adjacent moulds.

2. A process as in claim 1 further comprising the steps of feeding the moulds and castings along the channel into a rumbling barrel for breaking up the moulds, passing the moulds on into a shot blasting machine, screening the mould material from the rumbling barrel, and feeding at least a part of said material to a mixing machine where it is prepared for re-use.

3. A process as in claim 1 further comprising the steps of feeding the moulds and castings along the channel and feeding moulding material on to the top of the moulds for drying by the heat from the castings.

4. A process as in claim 1 wherein said moulding material is blown into the box from a blowing head through an opening in the upper end of the box, and the material is fed into the blowing head from a hopper through a power-operated shutter.

5. A process as in claim 1 wherein the pattern plates are retracted from the box after the moulding material has been compressed, the box is moved transversely out of alignment with the pattern plates and into alignment with the channel, and the mould is forced by power means out of the box into the channel.

6. A process as in claim 1 wherein the moulding material is sand bonded with sodium silicate and after the material has been compressed carbon dioxide gas is forced through it through holes in the box and in the pattern plates.

7. Apparatus for the production of castings comprising a mould-forming machine including means for compressing moulding material between opposed pattern plates to form moulds having complementary pattern impressions in opposed end faces, a channel in which said moulds are a sliding fit, means for moving the moulds transversely out of alignment with the pattern plates and into alignment with the channel, means for forcing the moulds into the channel, means for holding the moulds in the channel with their end faces in close contact, means for pouring metal into the cavities formed by the cooperation of the complementary mould impressions in adjacent moulds, means for separating and cleaning the castings, and means for preparing moulding material and supplying it to the mould forming machine.

8. Apparatus as in claim 7 wherein said mould-forming machine incorporates opposed platens carrying pattern plates, a slider movable transversely between the pattern plates and incorporating spaced openings forming boxes, power means for moving the slider to bring the boxes alternately into alignment with the pattern plates and with channels located on opposite sides of the machine, means for feeding moulding material into each box while it is in alignment with the pattern plates, power means associated with the platens for forcing the pattern plates into the box to compress the moulding material, and power means for forcing the formed mould out of the box into one of the channels when the box is in alignment therewith.

9. A process for the production of castings comprising the steps of feeding moulding material into an open-ended box, compressing the material in said box between opposed power-operated pattern plates to form moulds having complementary pattern impressions in their end faces, forcing the successive moulds so formed out of the box alternately into a first channel and a second channel in which they have a sliding fit, holding the moulds in each channel with their end faces in close contact, moving the succession of moulds in each channel past a fixed pouring point corresponding to that channel and pouring metal into the cavities formed by the co-operation of the complementary mould impressions in adjacent moulds.

10. Apparatus as in claim 7 wherein said moulding material compressing means comprises a box adapted to receive said pattern plates, and including a blowing head and a nozzle, said nozzle leading from said blowing head into said box, a hopper disposed above said blowing head and a power operated gate, said gate controlling communication between said hopper and said blowing head.

11. Apparatus as in claim 7 including power-operated platens, fluid-pressure operated locating and clamping means on said platens, said locating and clamping means being adapted to releasably secure said pattern plates on said platens, power-operated means for displacing said plattern plates from said platens on releasing of said locating and clamping means and for simultaneously introducing fresh pattern plates into the locations previously occupied by said displaced pattern plates.

References Cited in the file of this patent
UNITED STATES PATENTS

| | | |
|---|---|---|
| 704,951 | Adams | July 15, 1902 |
| 938,904 | Sherman | Nov. 2, 1909 |
| 2,486,388 | Brinton | Nov. 1, 1949 |
| 2,600,206 | Christensen | June 10, 1952 |
| 2,700,804 | Hines | Feb. 1, 1955 |
| 2,791,013 | Demmler | May 7, 1957 |

FOREIGN PATENTS

| | | |
|---|---|---|
| 200,254 | Australia | Nov. 11, 1955 |
| 343,478 | Germany | Nov. 3, 1921 |